(12) United States Patent
Lee

(10) Patent No.: US 9,274,312 B2
(45) Date of Patent: Mar. 1, 2016

(54) IMAGING LENS ASSEMBLY

(71) Applicant: ABILITY OPTO-ELECTRONICS TECHNOLOGY CO., LTD, Taichung (TW)

(72) Inventor: Hung-Wen Lee, Taichung (TW)

(73) Assignee: Ability Opto-Electronics Technology Co., LTD., Taichung (TW)

( * ) Notice: Subject to any disclaimer, the term of this patent is extended or adjusted under 35 U.S.C. 154(b) by 0 days.

(21) Appl. No.: 14/282,013

(22) Filed: May 20, 2014

(65) Prior Publication Data

US 2015/0109686 A1    Apr. 23, 2015

(30) Foreign Application Priority Data

Oct. 18, 2013    (TW) .............................. 102137705 A

(51) Int. Cl.
| | |
|---|---|
| *G02B 3/02* | (2006.01) |
| *G02B 13/18* | (2006.01) |
| *G02B 13/04* | (2006.01) |
| *G02B 9/34* | (2006.01) |
| *G02B 13/00* | (2006.01) |
| *G02B 9/58* | (2006.01) |

(52) U.S. Cl.
CPC ................ *G02B 13/004* (2013.01); *G02B 9/58* (2013.01); *G02B 9/34* (2013.01); *G02B 13/0015* (2013.01); *G02B 13/04* (2013.01); *G02B 13/18* (2013.01)

(58) Field of Classification Search
CPC ........ G02B 13/004; G02B 13/04; G02B 9/34; G02B 13/18; G02B 13/0015; G02B 9/58
USPC .......... 359/715, 740, 749, 753, 771, 781, 782
See application file for complete search history.

(56) References Cited

U.S. PATENT DOCUMENTS

2012/0176527 A1*    7/2012    Chen et al. ..................... 359/715

* cited by examiner

*Primary Examiner* — Evelyn A Lester
(74) *Attorney, Agent, or Firm* — LeClairRyan

(57) ABSTRACT

An imaging lens assembly includes first, second, third and fourth optical lens elements that are arranged sequentially from an object side to an image side along an optical axis and that respectively have negative, positive, positive and negative refractive powers, and a fixed aperture stop that is disposed between the first and second optical lens elements. The fourth optical lens element has object-side surface and an image-side surface that has at least an inflection point. The imaging lens assembly satisfies the optical condition of $1.8<TL/f<2.4$, in which, TL represents a distance from an object-side surface of the first optical lens element to an imaging plane, and f represents a focal length of the imaging lens assembly.

15 Claims, 20 Drawing Sheets

| | | Radius of Curvature | Thickness | Refractive Rate | Abbe Number |
|---|---|---|---|---|---|
| First Optical lens element 11 | Object-Side Surface 111 | 1.569 | 0.315 | 1.636 | 23.89 |
| | Image-Side Surface 112 | 0.843 | 0.157 | | |
| Fixed aperture stop 2 | | ∞ | -0.015 | | |
| Second Optical lens element 12 | Object-Side Surface 121 | 1.448 | 0.267 | 1.544 | 56.09 |
| | Image-Side Surface 122 | -2.189 | 0.095 | | |
| Third Optical lens element 13 | Object-Side Surface 131 | -1.931 | 0.42 | 1.544 | 56.09 |
| | Image-Side Surface 132 | -0.267 | 0.116 | | |
| Fourth Optical lens element 14 | Object-Side Surface 141 | -0.715 | 0.18 | 1.636 | 23.89 |
| | Image-Side Surface 142 | 0.985 | 0.045 | | |
| Filter 3 | Object-Side Surface 31 | ∞ | 0.145 | 1.517 | 64.17 |
| | Image-Side Surface 32 | ∞ | 0.055 | | |
| Cover Glass 4 | Object-Side Surface 41 | ∞ | 0.40 | 1.517 | 64.17 |
| | Image-Side Surface 42 | ∞ | 0.15 | | |

FIG.5

| | First Optical lens element 11 | | Second Optical lens element 12 | | Third Optical lens element 13 | | Fourth Optical lens element 14 | |
|---|---|---|---|---|---|---|---|---|
| | Object-Side Surface 111 | Image-Side Surface 112 | Object-Side Surface 121 | Image-Side Surface 122 | Object-Side Surface 131 | Image-Side Surface 132 | Object-Side Surface 141 | Image-Side Surface 142 |
| k | 3.542 | 6.428 | -21.835 | 3.853 | 22.772 | -3.716 | -39.373 | -0.484 |
| A | 1.0933 | 3.5188 | 1.9471 | -0.3291 | -0.2634 | -5.5988 | 0.7187 | -2.0718 |
| B | -0.6794 | 6.0482 | 15.0241 | -7.2519 | 1.8829 | 45.5245 | -12.0698 | 3.6693 |
| C | 6.4955 | -89.3309 | -309.0556 | -61.9039 | -89.2406 | -253.9747 | 28.5662 | -7.1412 |
| D | -14.8517 | 3252.0625 | 2119.078 | 451.1378 | 521.4926 | 549.4827 | -19.6896 | 9.7069 |
| E | 48.6884 | -0.0036 | 8.4120E-6 | 0.9275 | 0 | 325.1608 | -1.6649 | -7.3017 |
| F | 11.3991 | 0 | 0 | 0 | 0 | 0 | 8.2205 | 1.5713 |

FIG.6

|  |  | Radius of Curvature | Thickness | Refractive Rate | Abbe Number |
|---|---|---|---|---|---|
| First Optical lens element 11 | Object-Side Surface 111 | 2.154 | 0.315 | 1.636 | 23.89 |
|  | Image-Side Surface 112 | 1.178 | 0.19 |  |  |
| Fixed aperture stop 2 |  | ∞ | -0.03 |  |  |
| Second Optical lens element 12 | Object-Side Surface 121 | 1.255 | 0.260 | 1.544 | 56.09 |
|  | Image-Side Surface 122 | -2.35 | 0.187 |  |  |
| Third Optical lens element 13 | Object-Side Surface 131 | -2.205 | 0.345 | 1.544 | 56.09 |
|  | Image-Side Surface 132 | -0.251 | 0.087 |  |  |
| Fourth Optical lens element 14 | Object-Side Surface 141 | -0.528 | 0.18 | 1.636 | 23.89 |
|  | Image-Side Surface 142 | 0.979 | 0.046 |  |  |
| Filter 3 | Object-Side Surface 31 | ∞ | 0.145 | 1.517 | 64.17 |
|  | Image-Side Surface 32 | ∞ | 0.05 |  |  |
| Cover Glass 4 | Object-Side Surface 41 | ∞ | 0.40 | 1.517 | 64.17 |
|  | Image-Side Surface 42 | ∞ | 0.155 |  |  |

FIG. 11

|   | First Optical lens element 11 | | Second Optical lens element 12 | | | Third Optical lens element 13 | | Fourth Optical lens element 14 | |
|---|---|---|---|---|---|---|---|---|---|
|   | Object-Side Surface 111 | Image-Side Surface 112 | Object-Side Surface 121 | Image-Side Surface 122 | Object-Side Surface 131 | | Image-Side Surface 132 | Object-Side Surface 141 | Image-Side Surface 142 |
| k | 4.263 | 8.592 | -18.612 | 7.102 | 15.252 | | -4.082 | -32.327 | -1.649 |
| A | 1.2030 | 3.6972 | 1.7283 | -0.6997 | -0.7585 | | -5.9182 | 1.2804 | -1.7812 |
| B | -1.27784 | 7.5996 | 13.6877 | -3.9504 | 6.7015 | | 51.0573 | -14.3151 | 3.2425 |
| C | 6.9222 | -51.6870 | -282.4356 | -58.9314 | -70.3095 | | -273.3449 | 31.4302 | -7.0886 |
| D | -15.0896 | 2007.9814 | 1170.0429 | 20.4328 | 161.4855 | | 546.8494 | -19.6896 | 10.1410 |
| E | 35.0896 | 0.0492 | -0.0034 | 9.1423 | 0 | | 537.4535 | -1.6649 | -7.1493 |
| F | -25.5304 | 0 | 0 | 0 | 0 | | 0 | 8.2205 | 0.9758 |

FIG.12

| | | Radius of Curvature | Thickness | Refractive Rate | Abbe Number |
|---|---|---|---|---|---|
| First Optical lens element 11 | Object-Side Surface 111 | 2.102 | 0.443 | 1.636 | 23.89 |
| | Image-Side Surface 112 | 1.754 | 0.241 | | |
| Fixed aperture stop 2 | | ∞ | -0.02 | | |
| Second Optical lens element 12 | Object-Side Surface 121 | 3.181 | 0.460 | 1.544 | 56.09 |
| | Image-Side Surface 122 | -3.719 | 0.266 | | |
| Third Optical lens element 13 | Object-Side Surface 131 | -3.335 | 0.598 | 1.544 | 56.09 |
| | Image-Side Surface 132 | -0.501 | 0.247 | | |
| Fourth Optical lens element 14 | Object-Side Surface 141 | -1.398 | 0.28 | 1.636 | 23.89 |
| | Image-Side Surface 142 | 1.506 | 0.086 | | |
| Filter 3 | Object-Side Surface 31 | ∞ | 0.21 | 1.517 | 64.17 |
| | Image-Side Surface 32 | ∞ | 0.54 | | |

FIG.17

|   | First Optical lens element 11 | | Second Optical lens element 12 | | Third Optical lens element 13 | | Fourth Optical lens element 14 | |
|---|---|---|---|---|---|---|---|---|
|   | Object-Side Surface 111 | Image-Side Surface 112 | Object-Side Surface 121 | Image-Side Surface 122 | Object-Side Surface 131 | Image-Side Surface 132 | Object-Side Surface 141 | Image-Side Surface 142 |
| k | 1.823 | 10.158 | -47.3525 | 25.487 | 22.684 | -2.152 | -33.080 | 0.000 |
| A | 0.2190 | 0.756 | 0.3362 | 0.0407 | 0.0302 | 0.0944 | 0.3041 | -0.419 |
| B | 0.0869 | -0.7054 | 1.9093 | -0.682 | 0.1762 | -0.8078 | -1.315 | 0.1288 |
| C | 0.0558 | 4.2057 | -14.0958 | 0.5775 | -0.3707 | 0.8528 | 1.0799 | -0.0829 |
| D | -0.0453 | 12.1328 | 37.1022 | -1.0065 | 0.1273 | 0.1936 | -0.2886 | 0.0114 |
| E | 0.3357 | -2.5068E-5 | 0 | 0 | 0 | 0 | -0.0095 | 0.0185 |
| F | 0 | 0 | 0 | 0 | 0 | 0 | 0.0184 | -0.0074 |

FIG.18

| | | Radius of Curvature | Thickness | Refractive Rate | Abbe Number |
|---|---|---|---|---|---|
| First Optical lens element 11 | Object-Side Surface 111 | 1.971 | 0.433 | 1.585 | 30.00 |
| | Image-Side Surface 112 | 0.901 | 0.454 | | |
| Fixed aperture stop 2 | | ∞ | -0.020 | | |
| Second Optical lens element 12 | Object-Side Surface 121 | 1.537 | 0.514 | 1.544 | 56.09 |
| | Image-Side Surface 122 | -2.981 | 0.247 | | |
| Third Optical lens element 13 | Object-Side Surface 131 | -16.480 | 0.580 | 1.544 | 56.09 |
| | Image-Side Surface 132 | -0.574 | 0.293 | | |
| Fourth Optical lens element 14 | Object-Side Surface 141 | -1.021 | 0.288 | 1.585 | 30.00 |
| | Image-Side Surface 142 | 4.756 | 0.096 | | |
| Filter 3 | Object-Side Surface 31 | ∞ | 0.30 | 1.517 | 64.17 |
| | Image-Side Surface 32 | ∞ | 0.340 | | |

FIG.23

|  | First Optical lens element 11 | | Second Optical lens element 12 | | Third Optical lens element 13 | | Fourth Optical lens element 14 | |
|---|---|---|---|---|---|---|---|---|
|  | Object-Side Surface 111 | Image-Side Surface 112 | Object-Side Surface 121 | Image-Side Surface 122 | Object-Side Surface 131 | Image-Side Surface 132 | Object-Side Surface 141 | Image-Side Surface 142 |
| k | 3.192 | 1.710 | -6.916 | 3.125 | -29707.019 | -0.874 | -0.175 | 0.000 |
| A | 0.2255 | 0.3686 | -0.0077 | -0.2291 | -0.3800 | 0.8758 | 1.0901 | -0.1305 |
| B | -0.0171 | 3.6832 | 2.1832 | -0.6190 | 0.0976 | -1.7548 | -3.1186 | -0.1886 |
| C | 0.0769 | -17.8946 | -8.8740 | -0.8624 | -1.9044 | 1.5229 | 4.4179 | 0.2952 |
| D | -0.1685 | 38.8847 | 6.9978 | 3.8865 | 2.0953 | 0.5231 | -2.3317 | -0.1549 |
| E | 0.2095 | -0.0003 | 0 | 0 | 0 | 0 | -0.1494 | 0.0202 |
| F | 0 | 0 | 0 | 0 | 0 | 0 | 0.3040 | 0.0006 |

FIG.24

IMAGING LENS ASSEMBLY

CROSS-REFERENCE TO RELATED APPLICATION

This application claims priority of Taiwanese Application No. 102137705, filed on Oct. 18, 2013.

BACKGROUND OF THE INVENTION

1. Field of the Invention

The present invention relates to an imaging lens assembly.

2. Description of the Related Art

An imaging lens set is generally adopted in a mobile phone, a smart phone, a tablet computer, a notebook computer or an imaging lens assembly. With the rapid development of technology, these electronic devices are designed to be increasingly thinner. Therefore, the imaging lens set for these electronic devices should be made correspondingly smaller as well.

A conventional imaging lens set as disclosed in U.S. Pat. No. 8,274,593 includes four lenses.

SUMMARY OF THE INVENTION

Therefore, an object of the present invention is to provide an imaging lens assembly that has an alternative four-lens structure.

Accordingly, an imaging lens assembly includes an optical lens set and a fixed aperture stop. The optical lens set includes first, second, third and fourth optical lens elements that are arranged sequentially from an object side to an image side along an optical axis of the imaging lens assembly.

The first optical lens element has a negative refractive power near the optical axis. The first optical lens element has an object-side surface that faces the object side, and an image-side surface that faces the image side and that has a concave surface segment near the optical axis. At least one of the object-side surface and the image-side surface of the first optical lens element is aspheric.

The second optical lens element has a positive refractive power near the optical axis. The second optical lens element has an object-side surface that faces the object side, and a convex image-side surface that faces the image side. At least one of the object-side surface and the image-side surface of the second optical lens element is aspheric.

The third optical lens element has a positive refractive power near the optical axis. The third optical lens element has an object-side surface that faces the object side, and an image-side surface that faces the image side and that has a convex surface segment near the optical axis. At least one of the object-side surface and the image-side surface of the third optical lens element is aspheric.

The fourth optical lens element has a negative refractive power near the optical axis. The fourth optical lens element has an object-side surface that faces the object side and that has a concave surface segment near the optical axis, an aspheric image-side surface that faces the image side and that has a concave surface segment near the optical axis, and a peripheral surface interconnecting the object-side surface and the image-side surface. The image-side surface of the fourth optical lens element has an inflection point between the optical axis and the peripheral surface.

The fixed aperture stop is disposed between the first optical lens element and the second optical lens element.

The imaging lens assembly satisfies the following optical condition:

$$1.8 < TL/f < 2.4,$$

in which, TL represents a distance from the object side surface of the first optical lens element to the imaging plane along the optical axis, and f represents a focal length of the imaging lens assembly.

BRIEF DESCRIPTION OF THE DRAWINGS

Other features and advantages of the present invention will become apparent in the following detailed description of the preferred embodiments with reference to the accompanying drawings, of which:

FIG. 5 shows a table of optical parameters for optical lens elements, a fixed aperture stop, a filter and a cover glass of the first preferred embodiment;

FIG. 6 shows a table of parameters for aspheric surfaces of the first preferred embodiment;

FIG. 11 shows a table of optical parameters for optical lens elements, a fixed aperture stop, a filter and a cover glass of the second preferred embodiment;

FIG. 12 shows a table of parameters for aspheric surfaces of the second preferred embodiment;

FIG. 17 shows a table of optical parameters for optical lens elements, a fixed aperture stop and a filter of the third preferred embodiment;

FIG. 18 shows a table of parameters of aspheric surfaces of the third preferred embodiment;

FIG. 23 shows a table of optical parameters for optical lens elements, a fixed aperture stop and a filter of the fourth preferred embodiment; and FIG. 24 shows a table of parameters of aspheric surfaces of the fourth preferred embodiment.

DETAILED DESCRIPTION OF THE PREFERRED EMBODIMENTS

Figure 1:
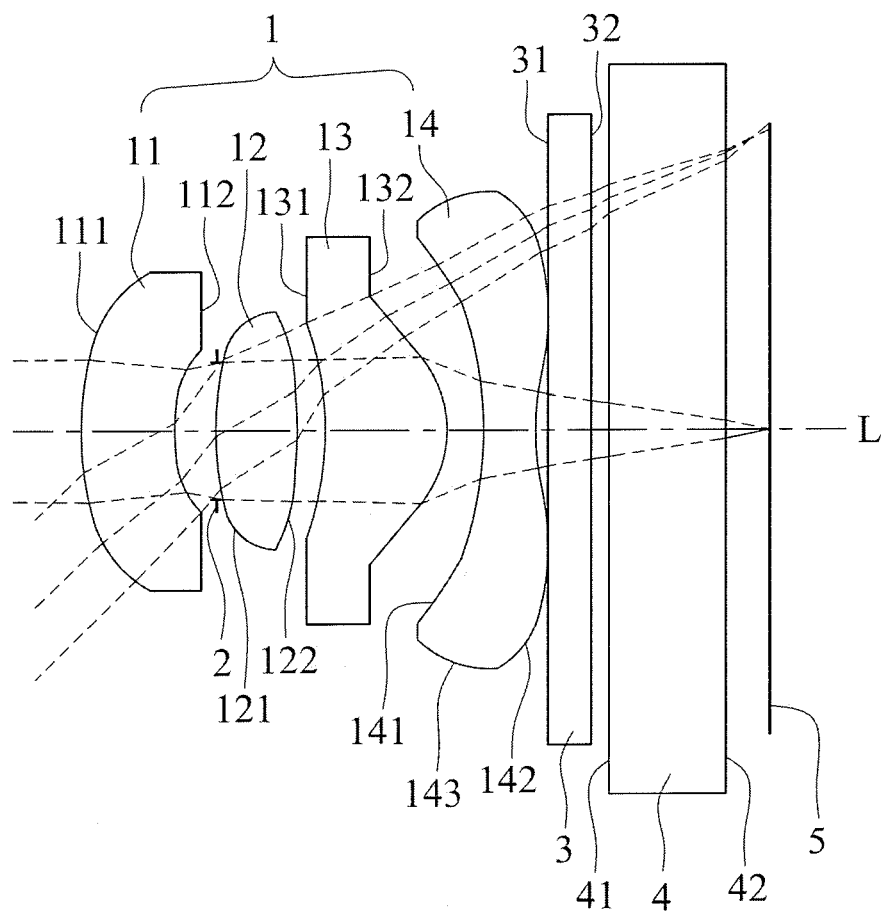
FIG. 1 is a schematic view of a first preferred embodiment of an imaging lens assembly according to the present invention.

Before the present invention is described in greater detail, it should be noted that like elements are denoted by the same reference numerals throughout the disclosure.

Referring to FIG. 1, an imaging lens assembly of the present invention includes an optical lens set 1, a fixed aperture stop 2, a filter 3 and, optionally, a cover glass 4, and is capable of forming an image on an imaging plane 5.

The optical lens set 1 includes a first optical lens element 11, a second optical lens element 12, a third optical lens element 13 and a fourth optical lens element 14 that are arranged sequentially from an object side to an image side along an optical axis (L) of the imaging lens assembly.

The first optical lens element 11 has a negative refractive power near the optical axis (L). The first optical lens element 11 has an object-side surface 111 that faces the object side, and an image-side surface 112 that faces the image side and that has a concave surface segment near the optical axis (L). At least one of the object-side surface 111 and the image-side surface 112 of the first optical lens element 11 is aspheric. The second optical lens element 12 has a positive refractive power near the optical axis (L). The second optical lens element 12 has an object-side surface 121 that faces the object side, and a convex image-side surface 122 that faces the image side. At least one of the object-side surface 121 and the image-side surface 122 of the second optical lens element 12 is aspheric. The third optical lens element 13 has a positive refractive power near the optical axis (L). The third optical lens element 13 has an object-side surface 131 that faces the object side, and an image-side surface 132 that faces the image side and that has a convex surface segment near the optical axis (L). At least one of the object-side surface 131 and the image-side surface 132 of the third optical lens element 13 is aspheric. The fourth optical lens element 14 has a negative refractive power near the optical axis (L). The fourth optical lens element 14 has an object-side surface 141 that faces the object side and that has a concave surface segment near the optical axis (L), an aspherical image-side surface 142 that faces the image side and that has a concave surface segment near the optical axis (L), and a peripheral surface 143 interconnecting the object-side surface 141 and the image-side surface 142. The image-side surface 142 of the fourth optical lens element 14 has an inflection point between the optical axis (L) and the peripheral surface 143.

The fixed aperture stop 2 is disposed between the first optical lens element 11 and the second optical lens element 12. Ideally, the optical axis (L) extends precisely through centers of the first, second, third and fourth optical lens elements 11, 12, 13, 14 and the fixed aperture stop 2. However, in actual assemblage, off-centre deviation(s) may occur. Having the fixed aperture stop 2 of the present invention disposed between the first and second optical lens elements 11, 12, and therefore between the first optical lens element 11 and the imaging plane 5 (as opposed to between the object side and the first optical lens element 11) may reduce aberrations resulting from off-centre deviation(s) and may enlarge a maximum viewing angle on the imaging plane 5.

The imaging lens assembly satisfies the following optical condition:

$$1.8 < TL/f < 2.4 \tag{eq1}$$

$$0.4 < f3/f < 0.8, \tag{eq2}$$

$$vd4 \leq 30, \tag{eq3}$$

$$0.5 < TD/TL < 0.9, \tag{eq4}$$

$$0.5 < \Sigma CT/TD < 0.9, \tag{eq5}$$

$$0.1 < T12/f < 0.5, \tag{eq6}$$

$$1.2 < (CT1+T12)/CT2 < 2.0, \tag{eq7}$$

$$0.6 < SL/TL < 1.0, \tag{eq8}$$

$$1.0 < R1/R2 < 2.5, \tag{eq9}$$

$$-1.0 < R3/R4 < -0.4, \tag{eq10}$$

$$-1.1 < R7/R8 < -0.1, \tag{eq11}$$

$$0.05 < CT4/f < 0.3, \tag{eq12}$$

$$CT1 < 0.45, \tag{eq13}$$

$$0.2 < f3/f2 < 0.7, \tag{eq14}$$

$$vd1 \leq 30, \tag{eq15}$$

in which, TL represents a distance from the object-side surface 111 of the first optical lens element 11 to the imaging plane 5 along the optical axis (L), f represents a focal length of the imaging lens assembly, f3 represents a focal length of the third optical lens element 13, vd4 represents an abbe number of the fourth optical lens element 14, TD represents a distance from the object-side surface 111 of the first optical lens element 11 to the image-side surface 142 of the fourth optical lens element 14 along the optical axis (L), ΣCT represents a sum of thicknesses of the first, second, third and fourth optical lens elements 11, 12, 13, 14, T12 represents a distance between the first optical lens element 11 and the second optical lens element 12 along the optical axis (L), CT1 represents a thickness of the first optical lens element 11 along the optical axis (L), CT2 represents a thickness of the second optical lens element 12 along the optical axis (L), SL represents a distance from the fixed aperture stop 2 to the imaging plane 5 along the optical axis (L), R1 represents a radius of curvature of the object-side surface 111 of the first optical lens element 11, R2 represents a radius of curvature of the image-side surface 112 of the first optical lens element 11, R3 represents a radius of curvature of the object-side surface 121 of the second optical lens element 12, R4 represents a radius of curvature of the image-side surface 122 of the second optical lens element 12, R7 represents a radius of curvature of the object-side surface 141 of the fourth optical lens element 14, R8 represents a radius of curvature of the image-side surface 142 of the fourth optical lens element 14, CT4 represents thickness of the fourth optical lens element 14 along the optical axis (L), f2 represents a focal length of the second optical lens element 12, f3 represents a focal length of the third optical lens element 13, and vd1 represents an abbe number of the first optical lens element 11.

According to Equation 1 (eq1), the value of TL/f is directly proportional to TL when f is fixed, and is inversely proportional to f when TL is fixed. Specifically, when the focal length of the imaging lens assembly is constant, the distance from the object-side surface 111 of the first optical lens element 11 to the imaging plane 5 along the optical axis (L) (i.e., an overall optical length of the imaging lens assembly) may be shortened due to the upper limit of 2.4 that is imposed on the value of TL/f, thereby leading to an imaging lens assembly with a smaller size. On the other hand, when the overall optical length of the imaging lens assembly is constant, the focal length of the imaging lens assembly may be shortened due to the lower limit of 1.8 that is imposed on the value of TL/f, thereby leading to an imaging lens assembly with a wider viewing angle.

In addition, an aspheric surface of the present invention satisfies the following equation:

$$z = \frac{ch^2}{1+[1-(k+1)c^2h^2]^{0.5}} + Ah^4 + Bh^6 + Ch^8 + Dh^{10} + Eh^{12} + Fh^{14} + Gh^{16} + Hh^{18} + Jh^{20} + \ldots, \quad (\text{eq } 4)$$

in which, z is the z-component of the displacement of the aspheric surface from the vertex of the aspheric surface along the optical axis (L), at a distance h from the optical axis (L); k is a conic constant; c is the reciprocal of a radius of curvature; and A, B, C, D, E, F, G, H and J, etc. are aspheric coefficients. The aspheric surface may correct aberrations and decrease tolerance sensitivity, and may also contribute to the wider viewing angle of the imaging lens assembly.

First Preferred Embodiment

Figures 2, 3:
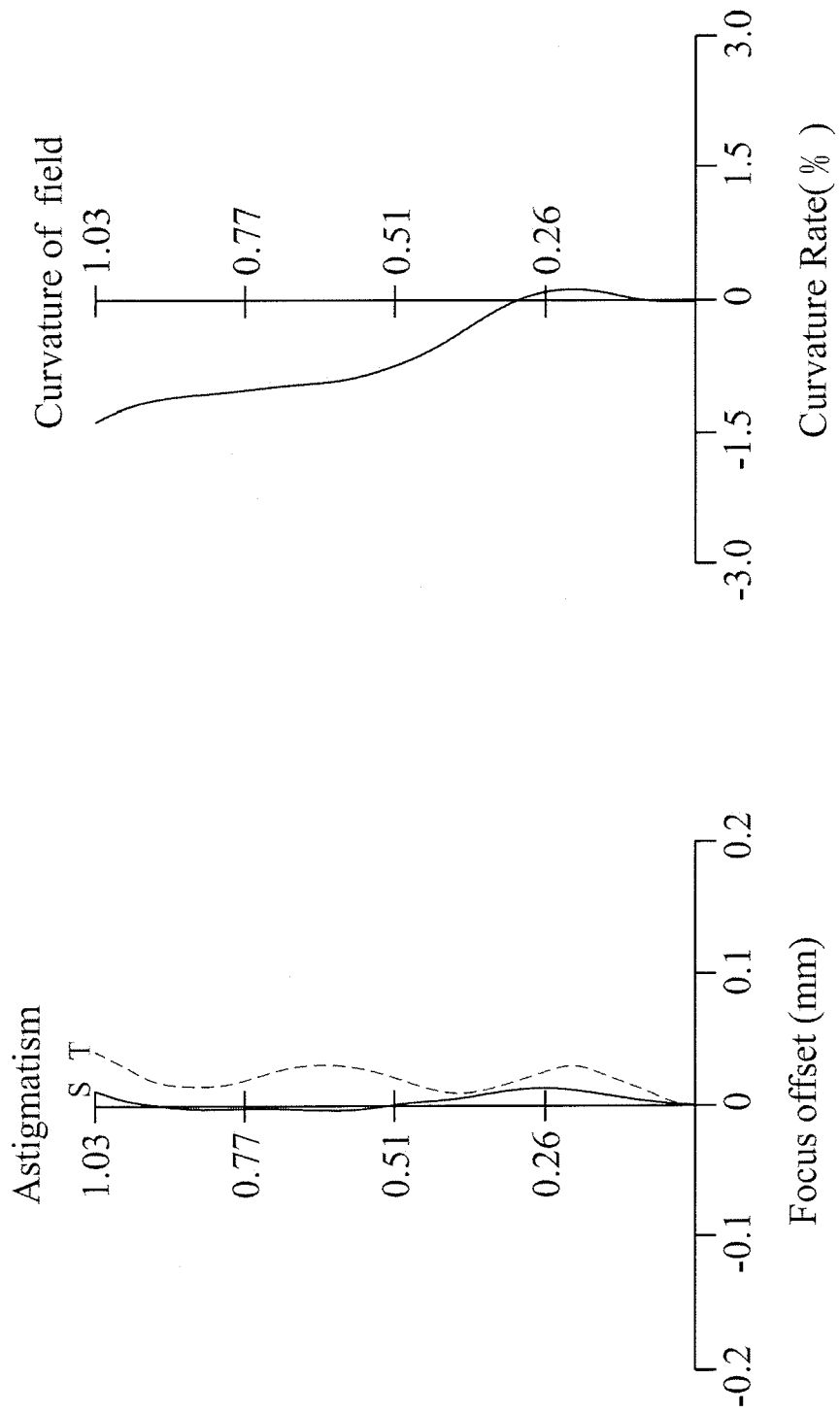
FIG. 2 shows a simulation result of astigmatism of the first preferred embodiment.
FIG. 3 shows a simulation result of curvature of field of the first preferred embodiment.
Figure 4:
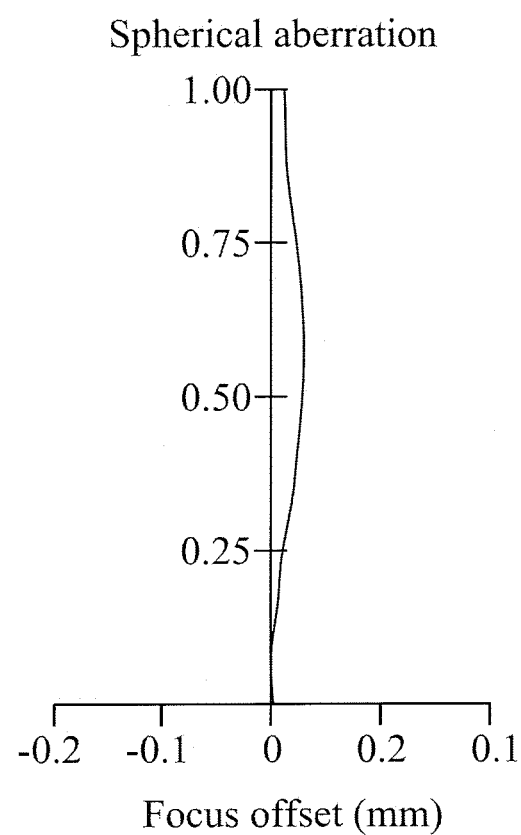
FIG. 4 shows a simulation result of spherical aberration the first preferred embodiment.

FIG. 1 is a schematic view of a first preferred embodiment of an imaging lens assembly according to the present invention. Each of the object-side surfaces 111, 121, 131, 141 and the image-side surfaces 112, 122, 132, 142 of the first, second, third and fourth optical lens elements 11, 12, 13, 14 of the first preferred embodiment is aspheric. FIGS. 2 to 4 respectively show simulation results of astigmatism, curvature of field, and spherical aberration of the first preferred embodiment. FIG. 5 shows a table of optical parameters for the optical lenses 11, 12, 13, 14, the fixed aperture stop 2, the filter 3 and the cover glass 4 of the first preferred embodiment. FIG. 6 shows a table of parameters for the aspheric surfaces 111, 112, 121, 122, 131, 132, 141, 142 of the first preferred embodiment.

In this preferred embodiment, TL=2.33 mm, f=1.068 mm, f3=0.521 mm, vd4=23.89, TD=1.54 mm, ΣCT=1.18 mm, T12=0.14 mm, CT1=0.32, CT2=0.27 mm, SL=2.14 mm, CT4=0.18 mm, f2=1.639 mm, vd1=23.89, R1=1.569, R2=0.843, R3=1.448, R4=−2.189, R7=−0.715 and R8=0.985, thereby satisfying the equations (1) to (15) with TL/f=2.18, f3/f=0.49, TD/TL=0.66, ΣCT/TD=0.77, T12/f=0.13, (CT1+T12)/CT2=1.71, SL/TL=0.920, R1/R2=1.86, R3/R4=−0.66, R7/R8=−0.73, CT4/f=0.17 and f3/f2=0.32.

Second Preferred Embodiment

Figure 7:
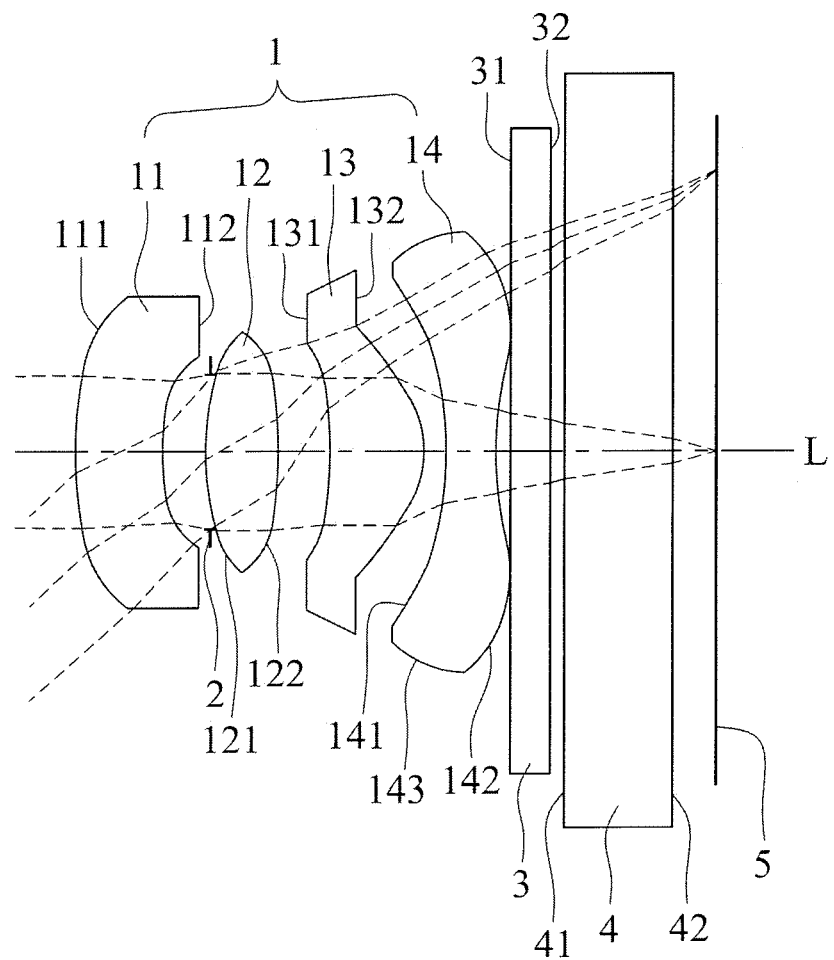
FIG. 7 is a schematic view of a second preferred embodiment of the imaging lens assembly according to the present invention.
Figures 8, 9:
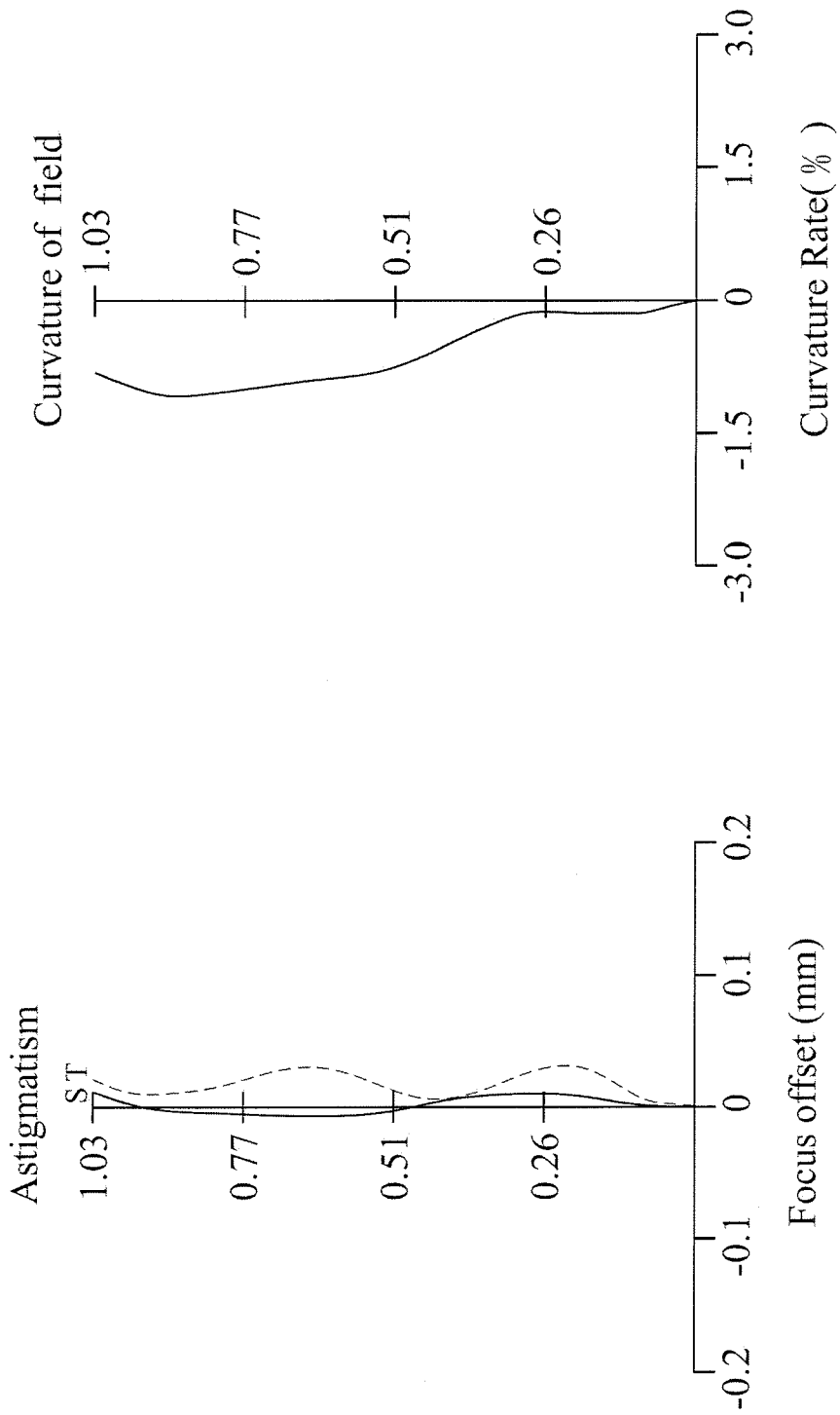
FIG. 8 shows a simulation result of astigmatism of the second preferred embodiment.
FIG. 9 shows a simulation result of curvature of field of the second preferred embodiment.
Figure 10:
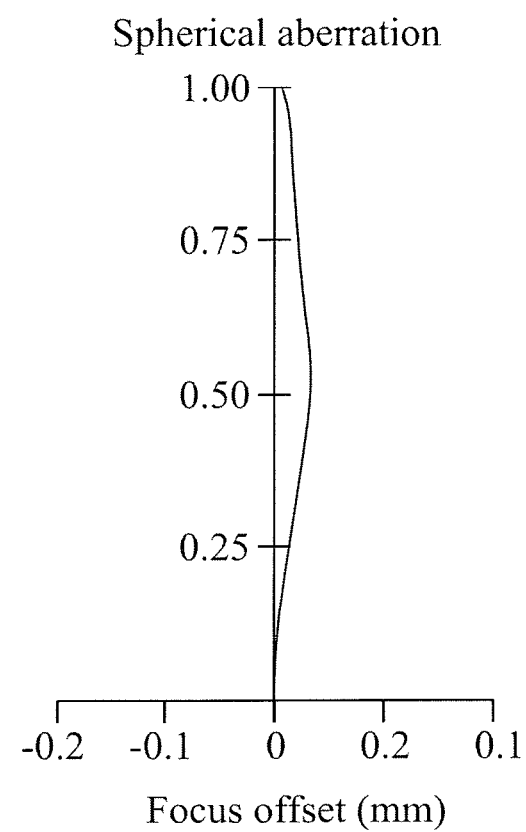
FIG. 10 shows a simulation result of spherical aberration the second preferred embodiment.

FIG. 7 is a schematic view of a second preferred embodiment of an imaging lens assembly according to the present invention. Each of the object-side surfaces 111, 121, 131, 141 and the image-side surfaces 112, 122, 132, 142 of the first, second, third and fourth optical lens elements 11, 12, 13, 14 of the second preferred embodiment is aspheric. FIGS. 8 to 10 respectively show simulation results of astigmatism, curvature of field, and spherical aberration of the second preferred embodiment. FIG. 11 shows a table of optical parameters for the optical lenses 11, 12, 13, 14, the fixed aperture stop 2, the filter 3 and the cover glass 4 of the second preferred embodiment. FIG. 12 shows a table of parameters for the aspheric surfaces 111, 112, 121, 122, 131, 132, 141, 142 of the second preferred embodiment.

In this preferred embodiment, TL=2.33 mm, f=1.146 mm, f3=0.489 mm, vd4=23.89, TD=1.53 mm, ΣCT=1.10 mm, T12=0.16 mm, CT1=0.32, CT2=0.26 mm, SL=2.10 mm, CT4=0.18 mm, f2=1.538 mm, vd1=3.89, R1=2.154, R2=1.178, R3=1.255, R4=−2.35, R7=−0.528 and R8=0.979, thereby satisfying the equations (1) to (15) with TL/f=2.0, f3/f=0.43, TD/TL=0.66, CT/TD=0.72, T12/f=0.14, (CT1+T12)/CT2=1.83, SL/TL=0.90, R1/R2=1.83, R3/R4=−0.53, R7/R8=−0.54, CT4/f=0.16 and f3/f2=0.32.

Third Preferred Embodiment

Figure 13:
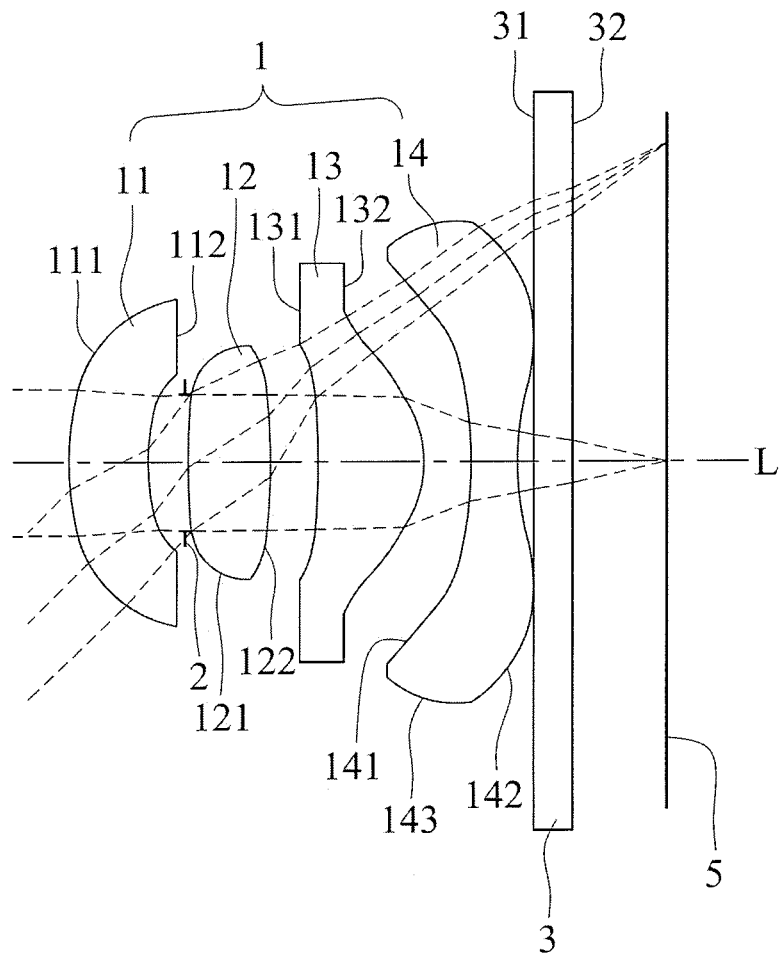
FIG. 13 is a schematic view of a third preferred embodiment of the imaging lens assembly according to the present invention.
Figures 14, 15:
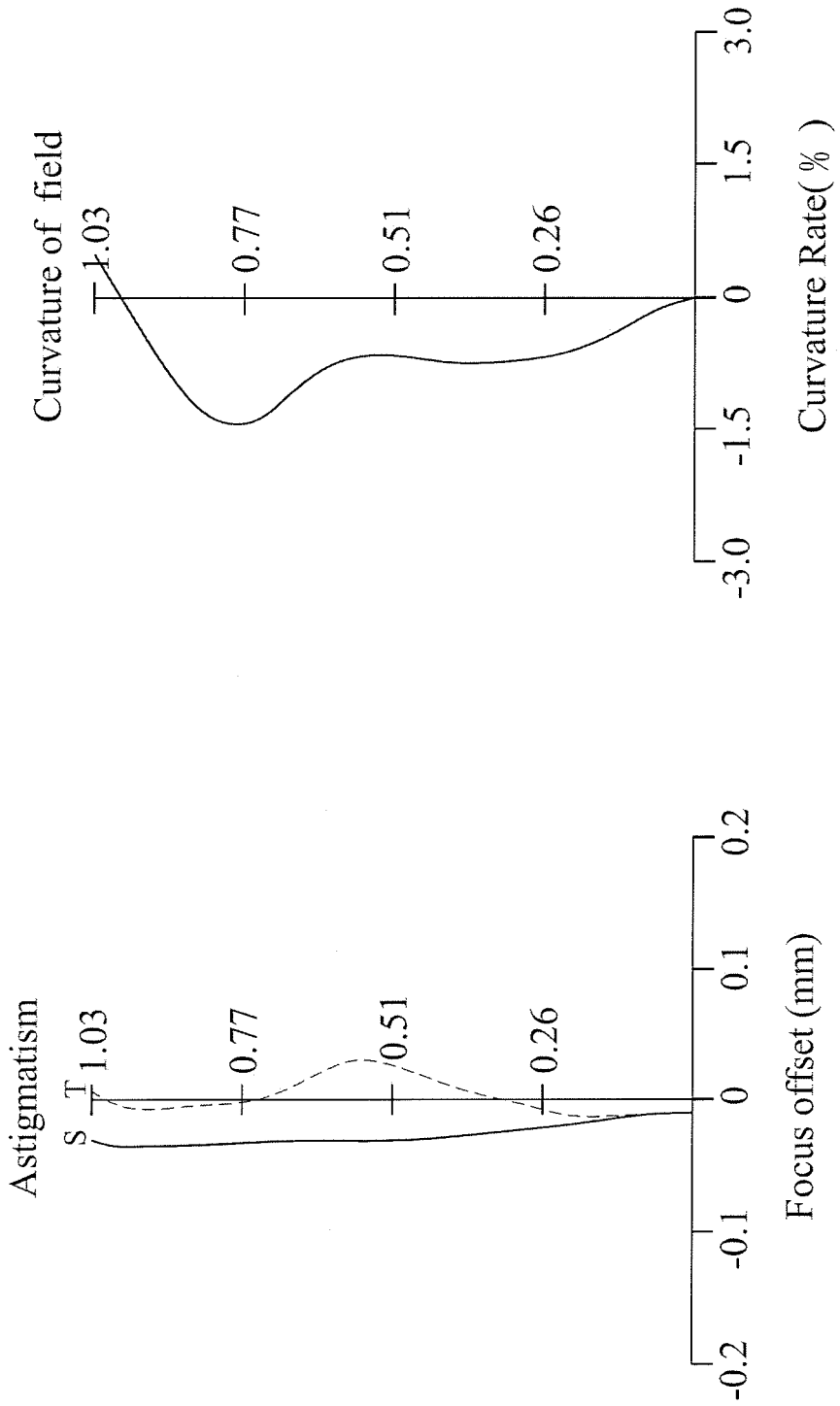
FIG. 14 shows a simulation result of astigmatism the third preferred embodiment.
FIG. 15 shows a simulation result of curvature of field of the third preferred embodiment.
Figure 16:
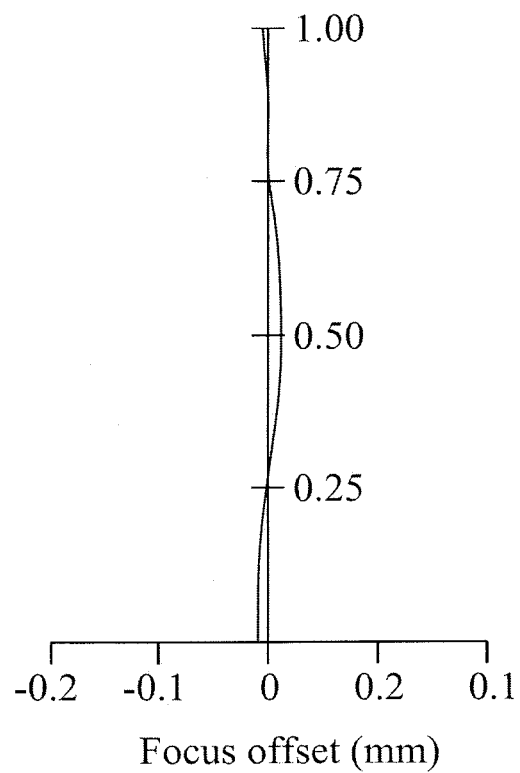
FIG. 16 shows a simulation result of spherical aberration the third preferred embodiment.

FIG. 13 is a schematic view of a third preferred embodiment of the imaging lens assembly according to the present invention. Each of the object-side surfaces 111, 121, 131, 141 and the image-side surfaces 112, 122, 132, 142 of the first, second, third and fourth optical lens elements 11, 12, 13, 14 of the third preferred embodiment is aspheric. In addition, the cover glass is omitted. FIGS. 14 to 16 respectively show simulation results of astigmatism, curvature of field, and spherical aberration of the third preferred embodiment. FIG. 17 shows a table of optical parameters for the optical lens elements 11, 12, 13, 14, the fixed aperture stop 2 and the filter 3 of the third preferred embodiment. FIG. 18 shows parameters for the aspheric surfaces 111, 112, 121, 122, 131, 132, 141, 142 of the third preferred embodiment.

In this preferred embodiment, TL=3.35 mm, f=1.832 mm, f3=1.005 mm, vd4=23.89, TD=2.51 mm, ΣCT=1.78 mm, T12=0.22 mm, CT1=0.44, CT2=0.46 mm, SL=3.00 mm, CT4=0.28 mm, f2=3.217 mm, vd1=23.89, R1=2.102, R2=1.754, R3=3.181, R4=−3.719, R7=−1.398 and R8=1.506, thereby satisfying the equations (1) to (15) with TL/f=1.83, f3/f=0.55, TD/TL=0.75, ΣCT/TD=0.71, T12/f=0.12, (CT1+T12)/CT2=1.45, SL/TL=0.90, R1/R2=1.20, R3/R4=−0.86, R7/R8=−0.93, CT4/f=0.15 and f3/f2=0.31.

Fourth Preferred Embodiment

Figure 19:
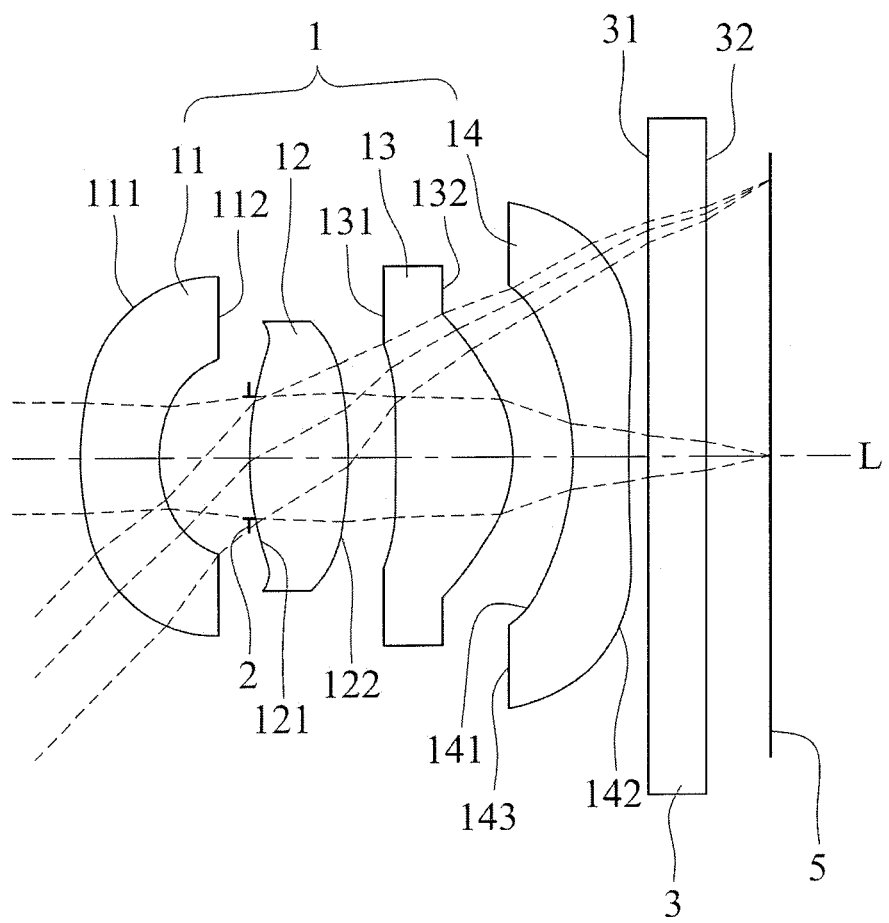
FIG. 19 is a schematic view of a fourth preferred embodiment of the imaging lens assembly according to the present invention.
Figures 20, 21:
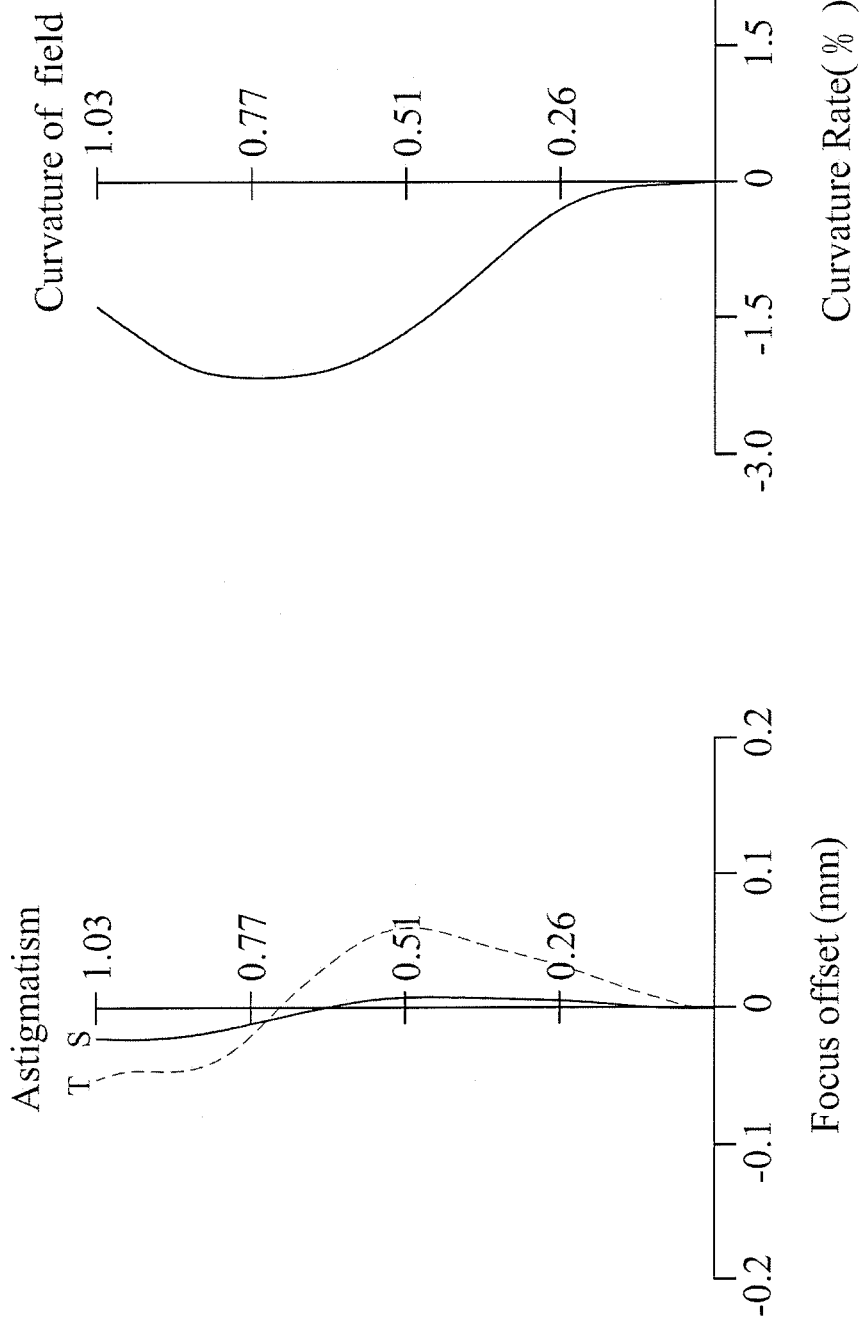
FIG. 20 shows a simulation result of astigmatism of the fourth preferred embodiment.
FIG. 21 shows a simulation result of curvature of field of the fourth preferred embodiment.
Figure 22:
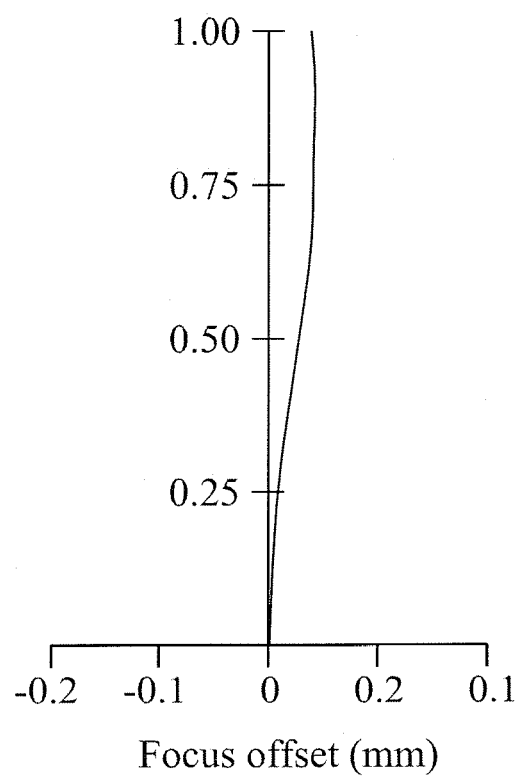
FIG. 22 shows a simulation result of spherical aberration the fourth preferred embodiment.

FIG. 19 is a schematic view of a fourth preferred embodiment of the imaging lens assembly according to the present invention. Each of the object-side surfaces 111, 121, 131, 141 and the image-side surfaces 112, 122, 132, 142 of the first, second, third and fourth optical lens elements 11, 12, 13, 14 of the fourth preferred embodiment is aspheric. In addition, the cover glass is omitted. FIGS. 20 to 22 respectively show simulation results of astigmatism, curvature of field, and spherical aberration of the fourth preferred embodiment. FIG. 23 shows a table of optical parameters for the optical lens elements 11, 12, 13, 14, the fixed aperture stop 2 and the filter 3 of the fourth preferred embodiment. FIG. 24 shows a table of parameters for the aspheric surfaces 111, 112, 121, 122, 131, 132, 141, 142 of the fourth preferred embodiment according to the present invention.

In this preferred embodiment, TL=3.52 mm, f=1.469 mm, f3=1.076 mm, vd4=30.00, TD=2.79 mm, CT=1.81 mm, T12=0.43 mm, CT1=0.43, CT2=0.51 mm, SL=3.08 mm, CT4=0.29 mm, f2=1.936 mm, vd1=30, R1=1.971, R2=0.901, R3=1.537, R4=−2.981, R7=−1.021 and R8=4.756, thereby satisfying the equations (1) to (15) with TL/f=2.40, f3/f=0.73, TD/TL=0.79, ΣCT/TD=0.65, T12/f=0.30, (CT1+T12)/CT2=1.69, SL/TL=0.87, R1/R2=2.19, R3/R4=−0.52, R7/R8=−0.21, CT4/f=0.20 and f3/f2=0.56.

To conclude, advantageous features of the imaging lens assembly according to the present invention are as follows:

1. The imaging lens assembly of the present invention satisfies the equation (1): 1.8<TL/f<2.4. The upper limit of 2.4 imposed on the value of TL/f allows the imaging lens assembly to have a smaller size under the same focal length as the prior art. The lower limit of 1.8 imposed on the value of TL/f allows the imaging lens assembly to have a wider viewing angle under the same overall optical length as the prior art.

2. The imaging lens assembly of the present invention satisfies the equations (2) to (4), thereby increasing a resolving power thereof, enlarging the maximum viewing angle on the imaging plane 5, and decreasing the overall thickness thereof.

3. The fixed aperture stop 2 of the present invention is disposed between the first and second optical lens elements 11, 12. As a result, despite off-centre deviation(s) of the optical lens elements 11, 12, 13, 14 and the fixed aperture stop 2, aberrations of the present invention may be reduced and the maximum viewing angle on the imaging plane 5 may be enlarged.

While the present invention has been described in connection with what are considered the most practical and preferred embodiments, it is understood that this invention is not limited to the disclosed embodiments but is intended to cover various arrangements included within the spirit and scope of the broadest interpretation so as to encompass all such modifications and equivalent arrangements.

What is claimed is:

1. An imaging lens assembly, comprising:
    an optical lens set including first, second, third and fourth optical lens elements that are arranged sequentially from an object side to an image side along an optical axis of said imaging lens assembly,
    said first optical lens element having a negative refractive power near the optical axis, said first optical lens element having an object-side surface that faces the object side, and an image-side surface that faces the image side and that has a concave surface segment near the optical axis, wherein at least one of said object-side surface and said image-side surface of said first optical lens element is aspheric,
    said second optical lens element having a positive refractive power near the optical axis, said second optical lens element having an object-side surface that faces the object side, and a convex image-side surface that faces the image side, wherein at least one of said object-side surface and said image-side surface of said second optical lens element is aspheric,
    said third optical lens element having a positive refractive power near the optical axis, said third optical lens element having an object-side surface that faces the object side, and an image-side surface that faces the image side and that has a convex surface segment near the optical axis, wherein at least one of said object-side surface and said image-side surface of said third optical lens element is aspheric, and
    said fourth optical lens element having a negative refractive power near the optical axis, and having an object-side surface that faces the object side and that has a concave surface segment near the optical axis, an aspherical image-side surface that faces the image side and that has a concave surface segment near the optical axis, and a peripheral surface interconnecting said object-side surface and said image-side surface, said image-side surface of said fourth optical lens element having an inflection point between the optical axis and said peripheral surface; and
    a fixed aperture stop disposed between said first optical lens element and said second optical lens element,
    wherein said imaging lens assembly satisfies the following optical conditions:

$1.8<TL/f<2.4$, and $CT1<0.45$ in which, TL represents a distance from said object-side surface of said first optical lens element to an imaging plane along the optical axis, f represents a focal length of said imaging lens assembly, and CT1 represents a thickness of said first optical lens element along the optical axis.

2. The imaging lens assembly as claimed in claim 1, satisfying the following optical condition:

$0.4<f3/f<0.8$, in which, f3 represents a focal length of said third optical lens element, and f represents the focal length of said imaging lens assembly.

3. The imaging lens assembly as claimed in claim 1, satisfying the following optical condition:

$vd4 \leq 30$, in which, vd4 represents an abbe number of said fourth optical lens element.

4. The imaging lens assembly as claimed in claim 1, wherein said object-side surface of said fourth optical lens element is aspheric.

5. The imaging lens assembly as claimed in claim 1, satisfying the following optical condition:

$0.5<TD/TL<0.9$, in which, TD represents a distance from said object-side surface of said first optical lens element to said image-side surface of said fourth optical lens element along the optical axis.

6. The imaging lens assembly as claimed in claim 1, satisfying the following optical condition:

$0.5<\Sigma CT/TD<0.9$, in which, TD represents a distance from said object-side surface of said first optical lens element to said image-side surface of said fourth optical lens element along the optical axis, and $\Sigma CT$ represents a sum of thicknesses of said first, second, third and fourth optical lens elements.

7. The imaging lens assembly as claimed in claim 1, satisfying the following optical condition:

$0.1<T12/f<0.5$, in which, T12 represents a distance between said first optical lens element and said second optical lens element along the optical axis.

8. The imaging lens assembly as claimed in claim 1, satisfying the following optical condition:

$1.2<(CT1+T12)/CT2<2.0$, in which, T12 represents a distance between said first optical lens element and said second optical lens element along the optical axis, and CT2 represents thickness of said second optical lens element along the optical axis.

9. The imaging lens assembly as claimed in claim 1, satisfying the following optical condition:

$0.6<SL/TL<1.0$, in which, SL represents a distance from said fixed aperture stop to the imaging plane along the optical axis.

10. The imaging lens assembly as claimed in claim 1, satisfying the following optical condition:

$1.0<R1/R2<2.5$, in which, R1 represents a radius of curvature of said object-side surface of said first optical lens element, and R2 represents a radius of curvature of said image-side surface of said first optical lens element.

11. The imaging lens assembly as claimed in claim 1, satisfying the following optical condition:

$-1.0 < R3/R4 < -0.4$, in which, R3 represents a radius of curvature of said object-side surface of said second optical lens element, and R4 represents a radius of curvature of said image-side surface of said second optical lens element.

12. The imaging lens assembly as claimed in claim 1, satisfying the following optical condition:

$-1.1 < R7/R8 < -0.1$, in which, R7 represents a radius of curvature of said object-side surface of said fourth optical lens element, and R8 represents a radius of curvature of said image-side surface of said fourth optical lens element.

13. The imaging lens assembly as claimed in claim 1, satisfying the following optical condition:

$0.05 < CT4/f < 0.3$, in which, CT4 represents a thickness of said fourth optical lens element along the optical axis.

14. The imaging lens assembly as claimed in claim 1, satisfying the following optical condition:

$0.2 < f3/f2 < 0.7$, in which, f2 and f3 represent focal lengths of said second and third optical lens elements, respectively.

15. The imaging lens assembly as claimed in claim 1, satisfying the following optical condition:

$vd1 \leq 30$, in which, vd1 represents an abbe number of said first optical lens element.

* * * * *